United States Patent
Chowdhury et al.

(10) Patent No.: US 8,088,523 B2
(45) Date of Patent: Jan. 3, 2012

(54) STARTUP RELIABILITY USING HFR MEASUREMENT

(75) Inventors: Akbar Chowdhury, Pittsford, NY (US); Seth E. Lerner, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 817 days.

(21) Appl. No.: 12/134,456

(22) Filed: Jun. 6, 2008

(65) Prior Publication Data

US 2009/0305099 A1    Dec. 10, 2009

(51) Int. Cl.
H01M 8/04 (2006.01)
H01M 8/24 (2006.01)

(52) U.S. Cl. ........ 429/429; 429/430; 429/433; 429/444; 429/454

(58) Field of Classification Search .................. 429/431, 429/432, 442, 444, 434, 429, 430, 454; 180/65.31
See application file for complete search history.

(56) References Cited

U.S. PATENT DOCUMENTS

| | | | | |
|---|---|---|---|---|
| 4,310,605 A * | 1/1982 | Early et al. | | 429/431 |
| 2003/0224227 A1* | 12/2003 | Voss et al. | | 429/13 |
| 2004/0137295 A1* | 7/2004 | Houlberg | | 429/26 |
| 2006/0263653 A1* | 11/2006 | Sinha et al. | | 429/13 |

* cited by examiner

*Primary Examiner* — Jonathan Crepeau
*Assistant Examiner* — Kenneth Douyette
(74) *Attorney, Agent, or Firm* — John A. Miller; Miller IP Group, PLC

(57) ABSTRACT

A system and method for improving fuel cell system start-up reliability. The method includes determining if the resistance of the membranes in a fuel cell stack is too high, where the reliability of system start-up will be reduced, and if so, providing one or more remedial actions to help ensure that the start-up is more reliable. In one embodiment, the system and method determine that the fuel cell membranes are to dry based on whether a high frequency measurement of the fuel cell stack exceeds a predetermined HFR threshold. If the HFR threshold has been exceeded, a special start-up procedure is used that increases the reliability that the start-up will be successful using the remedial actions, such as reducing cathode airflow and turning on stack end cell heaters.

12 Claims, 2 Drawing Sheets

STARTUP RELIABILITY USING HFR MEASUREMENT

BACKGROUND OF THE INVENTION

1. Field of the Invention

This invention relates generally to a system and method for improving the start-up reliability of a fuel cell system and, more particularly, to a system and method for improving the start-up reliability of a fuel cell system by providing a high frequency resistance measurement (HFR) of the fuel cell stack, where the system and method reduce cathode air compressor flow and/or provide a stack load for a stack current flow to reduce drying of the membrane and/or increase membrane humidification.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is controlled to a desired relative humidity of the membranes by controlling several stack operating parameters, such as stack pressure, temperature, cathode stoichiometry and the relative humidity of the cathode air into the stack.

The end cells in a fuel cell stack typically have a different performance and sensitivity to operating conditions than the other cells in the stack. Particularly, the end cells are nearest in location to the stack's ambient temperature surroundings, and thus have a temperature gradient that causes them to operate at a lower temperature as a result of heat losses. Because the end cells are typically cooler than the rest of the cells in the stack, gaseous water more easily condenses into liquid water so that the end cells have a higher relative humidity, which causes water droplets to more readily form in the flow channels of the end cells. It is known in the art to heat the end cells of a fuel cell stack using resistive heaters positioned between the end unit and the unipolar plate so as to compensate for heat losses.

It has been shown that the longer a fuel cell system has been shut-down, the less reliable the next system start-up will be. Particularly, system start-up after the fuel cell system has been off for a significant period of time typically provides an occurrence of start-up failure as a result of one or more of the cells within the fuel cell stack lacking the ability to conduct the required amount of current. It has been suggested that one of the contributing factors for such a stack failure at system start-up is a result of the high resistance of the membrane within the fuel cell, which is a direct result of its ability to conduct the protons. It has been proposed that this high membrane resistance is a result of the membrane being to dry.

SUMMARY OF THE INVENTION

In accordance with the teachings of the present invention, a system and method are disclosed for improving fuel cell system start-up reliability. The method includes determining if the resistance of the membranes in a fuel cell stack is too high, where the reliability of system start-up will be reduced, and if so, providing one or more remedial actions to help ensure that the start-up is more reliable. In one embodiment, the system and method determine that the fuel cell membranes are to dry based on whether a high frequency resistance measurement of the fuel cell stack exceeds a predetermined HFR threshold. If the HFR threshold has not been exceeded, then a normal start-up procedure will be followed with the recognition that the resistance of the membrane is low enough to provide a reliable start. If the HFR threshold has been exceeded, a special start-up procedure is used that increases the reliability that the start-up will be successful. The special start-up procedure includes various actions that can help prevent the membranes from further drying out and/or increasing membrane humidity. To reduce the membranes from further drying out, a lower cathode airflow rate can be provided than during the normal start-up procedure to reduce the drying effect of the cathode air on the membranes. Further, an internal stack load, for example, end cell heaters, can be turned on during the special start-up procedure so that current flow through the stack can generate water that increases stack humidity.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for changing start-up procedures of a fuel cell system to increase system start-up reliability in response to a determination that membranes in the fuel cell stack may be too dry and have too high of a resistance is merely exemplary in nature, and is in no way intended to limit the invention or its applications or uses.

Figure 1:
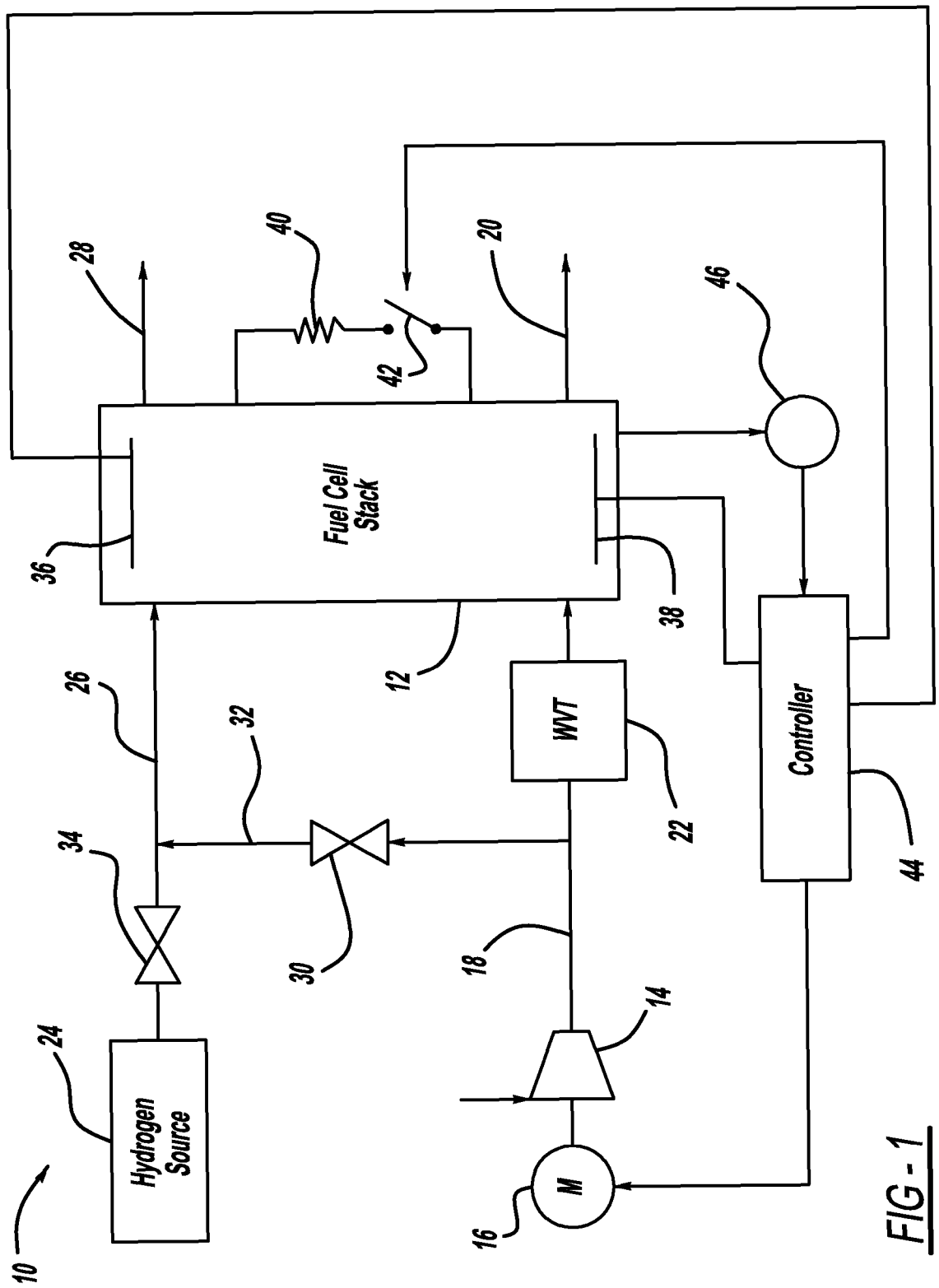
FIG. 1 is a schematic block diagram of a fuel cell system.

FIG. 1 is a schematic block diagram of a fuel cell system 10 including a fuel cell stack 12. The system 10 also includes a compressor 14 driven by a motor 16 that provides a cathode inlet airflow on cathode input line 18 to the stack 12. A cathode exhaust gas is output on a cathode exhaust gas line 20. A water vapor transfer (WVT) unit 22 is provided in the cathode input line 18 to humidify the cathode airflow in a manner that is well understood to those skilled in the art. Although not specifically shown, the moisture for the WVT unit 22 would typically be provided by the cathode exhaust gas. A hydrogen source 24 provides fresh dry hydrogen to the anode side of the fuel cell stack 12 on anode input line 26, where an anode exhaust gas is output from the stack 12 on anode exhaust gas line 28.

During shut-down of the system 10, the cathode and anode flow channels in the fuel cell stack 12 are typically purged to remove excess water therein and provide a stack relative humidity suitable for the next system start-up. In order to provide this purge, a purge valve 30 is provide in a purge line 32 connecting the cathode input line 18 to the anode input line 26 so that air from the compressor 14 can be directed to both the cathode and anode flow channels in the fuel cell stack 12 when the valve 30 is open. The hydrogen source 24 is closed off by valve 34 during the purge.

The fuel cell stack 12 includes end cell heaters 36 and 38 that heat the end-cells of the stack 12 during certain operating conditions for reasons that are well known to those skilled in the art. Further, the system 10 includes an internal stack load 40, for example, a resistor, that provides a load on the stack 12 to provide a current draw from the stack 12 for reasons that will be discussed in detail below. A controller 44 controls the various system components discussed above, including the motor 16, the end-cell heaters 36 and 38 and a switch 42 that selectively switches the load 40 across the stack 12.

As discussed above, it is generally necessary to control the stack humidity so that the membranes in the stack 12 have the proper electrical conductivity, but where the flow channels do not become blocked by ice if the water freezes during system shut-down. One technique for measuring membrane humidification is referred to in the art as high frequency resistance (HFR) humidification measuring. HFR humidification measurements are generated by providing a high frequency component on the electrical load of the stack 12 so that a high frequency ripple is produced on the current output of the stack 12. The resistance of the high frequency component is then measured by a detector 46, which is a function of the level of humidification of the membranes in the stack 12. In one of the embodiments discussed below, the system 10 does not include the detector 46.

The fuel cell system 10 includes a single stack 12, as discussed above. It is known in the art to split fuel cell stacks in a fuel cell system into two or more sub-stacks because the number of fuel cells required for a fuel cell stack to generate enough power for automotive purposes is significant, which creates flow distribution problems. In certain fuel cell system designs, anode flow shifting is used, known to those skilled in the art, where the anode gas flows back and forth between two split sub-stacks. For the purposes of the discussion below, the fuel cell stack 12 is a split stack that includes sub-stack A and sub-stack B. However, as will be appreciated by those skilled in the art, this is merely for discussion purposes only in that the stack 12 can be a single stack, or any suitable number of split stacks.

One known fuel cell system start-up procedure performs a header purge and flush of hydrogen on the anode side of the stack 12. The process then ramps up the delivery of air to the cathode from the compressor 14, and after some time proceeds to close the contactors that allow the stack 12 to be connected to system loads. This is followed shortly afterwards by the system 10 entering the run state where the vehicle is allowed to be driven. On certain occasions under certain conditions, shortly after entering the run state, some of the cell voltages in the stack may collapse under the load, and lead to a quick stop or a shut-down of the system 10.

Figure 2:
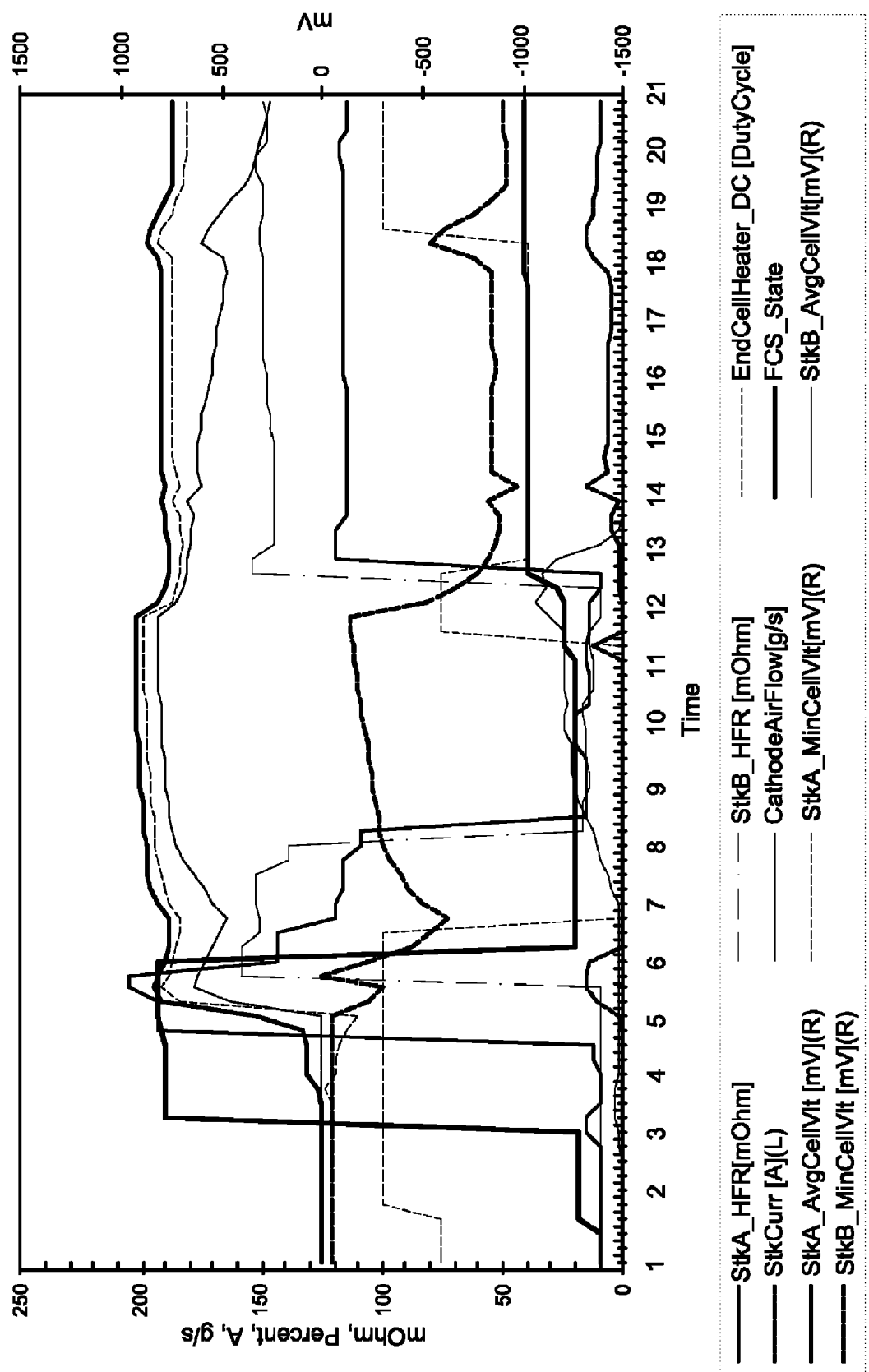
FIG. 2 is a graph showing various fuel cell system parameters at system start-up.

FIG. 2 is a graph with time on the horizontal axis and various applicable units on the vertical axis showing a number of parameters of a fuel cell system during system start-up. These values, identified by the graph legend, include the HFR of sub-stack A (StkA-HFR), the end cell duty cycle (EndCellHeater_DC), the start-up state (FCS_State), the average cell voltage for sub-stack B (StkB_AvgCellVlt), the HFR of sub-stack B (StkB_HFR), the stack current (StkCurr), the average cell voltage of sub-stack A (StkA_AvgCellVlt), minimum cell voltage of sub-stack B (StkB_MinCellVlt), the cathode air supply (CathodeAirFlow) and the minimum cell voltage for sub-stack A (StkA_MinCellVlt).

During the start-up procedure defined by the graph, the start-up failed as a result of the HFR of the sub-stacks A and/or B being too high. The present invention proposes that an HFR value greater than 120 milliohms will cause a failed system start-up, which is shown in the graph after time point 13. Although the system has not been successfully started during this start-up sequence, a current was produced between time points 5 and 7. As a result of this current, water was produced by the stack 12, which subsequently operated to reduce the stack HFR, as shown by the StkA_HFR and StkB_HFR graph lines after the current was produced. However, because the current flow was limited and temporary, the HFR values for one or both of the sub-stacks A and B returned to values well over 120 milliohms. Further, the graph shows that the cathode air supply was high, thus having a drying effect on the cell membranes.

The present invention proposes a system and method for determining whether the HFR of the cell membranes may be too high, which will increase the likelihood of a failed system start-up. If the fuel cell system determines that the HFR measurement is not too high, meaning that the cell membranes are not too dry, then the system goes into its normal start-up procedure. If, however, the system determines that the HFR is too high, then the system goes into a special start-up procedure that includes taking remedial actions to reduce further drying of the membranes and/or increasing the humidity level of the membranes.

According to the invention, different techniques can be used to determine whether the humidity level of the membranes is likely to cause a failed start-up as a result of the passage of time. The system 10 includes the detector 46 for measuring the HFR of the fuel cell stack 12. Therefore, at system start-up, if the controller 44 determines that the HFR of the stack 12 is above a predetermined threshold value, for example 120 milliohms, it can go into the special start-up procedure that includes the remedial actions.

Analysis of multiple failed starts after an extended off time has shown that the HFR during start-up tends to be high. This corresponds to a low membrane humidification, and in turn lower conductivity across the membrane. The proper humidification of the membranes is crucial to the ability of the membrane to support any load across it. The present invention captures the HFR during start-up when it is believed to be valid. The overall goal would be to bring the HFR value to some level that corresponds to a known value where the membrane would be capable of supporting some load. In the current start-up strategy, during the crucial point where the HFR needs to be measured, the HFR measurement is no longer available. This is due to the fact that there is no current propagating through the stack, which is necessary for HFR measurements. The last known good HFR measurement could be used as an estimated HFR.

One of the remedial actions may include reducing the amount of cathode air provided to the cathode side of the fuel cell stack 12 on the input line 18 by the compressor 14 during the start-up procedure. The fuel cell stack 12 needs air to generate current. Known fuel cell system start-up procedures typically employ a cathode air flow by the compressor 14 of about 30 grams/seconds. Such an amount of air is significant and has a high drying affect on the membranes in the stack 12. By reducing this airflow, for example, to 5-10 grams/seconds, the drying effect is significantly reduced, but there is still enough cathode air to allow the stack 12 to generate some current, certainly enough for system start-up.

Another remedial action to prevent a failed system start-up can be to generate stack current during the start-up procedure, which will produce water that provides membrane humidity. In one known system start-up procedure, the end cell heaters 36 and 38 will be operated for a limited period of time as part of the warm up process of the fuel cell stack 12. The current generated by the sub-stacks A and B for operating the end cell heaters 36 and 38 is shown in the graph between time points 5 and 7, as mentioned above. However, as shown by the graph in FIG. 2, this limited amount of stack current to drive the end cell heaters 36 and 38 may not produce enough water to prevent the start-up from failing. Therefore, this remedial action can include ramping up the end-cell heaters 36 and 38 at a certain duty cycle to a certain power level during the start-up sequence so that more current is being generated by the stack 12, which will produce more water. The quantity of water that is generated can be calculated to provide the minimum level known to bring the stack average humidification to the proper level.

Yet another alternative could be to drive the end cell heaters 36 and 38 at a level that causes the average stack voltage to collapse somewhat. This can also be used as a measure of the quantity of the water that is produced at the membrane.

Some fuel cell stacks may not include end cell heaters in their particular design. In these cases, a separate internal load on the fuel cell stack 12 can be provided that consumes current generated by the stack 12. For this embodiment, the load is represented by the resistor 40 and is merely a load to consume current by the stack 12. If the system 10 goes into the special start-up sequence to prevent a failed start-up, the controller 44 can close the switch 42 during the start-up sequence so that current can be drawn from the stack 12.

In some fuel cell system designs, the detector 46 may not be provided, and thus, the HFR of the stack 12 will not be known. In these systems, the present invention proposes going to the special start-up procedure that uses the remedial actions discussed above based solely on the amount of time that passed since the last system shut-down. In one non-limiting embodiment, the time can be set at 72 hours where the controller 44 will go to the special start-up procedure for improved start-up reliability if the system 10 has been shut-down for that period of time or longer.

As another alternative to the remedial concepts discussed above, simple voltage measurements could be used to accomplish relatively the same thing. Data analysis has shown that if a fuel cell system has been sitting in the off state for an extended period of time, the cathode will fill up with air. Consequently, during the anode purge/flush, or the introduction of hydrogen to the anode, some or all of the cell voltages will come up. This voltage is not normally present during the anode purge/flush if the system 10 has only been sitting for a short period of time because most or all of the oxygen was consumed during the previous shut down, and air has not had a chance to permeate through the stack 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for starting a fuel cell system including a fuel cell stack, said method comprising:
   providing a high frequency resistance (HER) measurement of the fuel cell stack;
   determining if the high frequency resistance measurement is above a predetermined HFR threshold; and
   performing one or more remedial actions that prevents membranes within the fuel cell stack from further drying out if the high frequency resistance measurement is above the HFR threshold, wherein performing one or more remedial actions includes connecting an internal stack load across the stack.

2. The method according to claim 1 wherein the HFR threshold is 120 milliohms.

3. The method according to claim 1 wherein performing one or more remedial actions includes limiting a flow of air to the cathode side of the fuel cell stack.

4. The method according to claim 3 wherein providing the flow of air to the cathode side of the fuel cell stack includes providing a cathode side air flow in the range of 5-10 grams/seconds.

5. The method according to claim 1 wherein performing one or more remedial actions includes turning on end cell heaters in the fuel cell stack.

6. The method according to claim 1 wherein providing a high frequency resistance measurement of the fuel cell stack includes using a detector that measures the high frequency resistance.

7. The method according to claim 1 wherein the fuel cell stack is split sub-stacks.

8. A method for starting a fuel cell system including a fuel cell stack, said method comprising:

providing a high frequency resistance (HFR) measurement of the fuel cell stack;

determining if the high frequency resistance measurement is above a predetermined HFR threshold;

limiting a flow of air to the cathode side of the fuel cell stack if the HFR measurement is above the HFR threshold; and turning on end cell heaters in the fuel cell stack if the HFR measurement is above the HFR threshold.

9. The method according to claim 8 wherein the HFR threshold is 120 milliohms.

10. The method according to claim 8 wherein limiting the flow of air to the cathode side of the fuel cell stack includes providing a cathode side air flow in the range of 5-10 grams/seconds.

11. The method according to claim 8 wherein the fuel cell stack is split sub-stacks.

12. The method according to claim 8 wherein providing a high frequency resistance measurement of the fuel cell stack includes using a detector that measures the high frequency resistance.

* * * * *